United States Patent
Giaimo et al.

(10) Patent No.: US 7,628,579 B2
(45) Date of Patent: *Dec. 8, 2009

(54) GEAR TRAIN VARIABLE VANE SYNCHRONIZING MECHANISM FOR INNER DIAMETER VANE SHROUD

(75) Inventors: John A. Giaimo, Weston, FL (US); John P. Tirone, III, Moodus, CT (US)

(73) Assignee: United Technologies Corporation, Hartford, CT (US)

( * ) Notice: Subject to any disclaimer, the term of this patent is extended or adjusted under 35 U.S.C. 154(b) by 550 days.

This patent is subject to a terminal disclaimer.

(21) Appl. No.: 11/185,624

(22) Filed: Jul. 20, 2005

(65) Prior Publication Data

US 2007/0020092 A1    Jan. 25, 2007

(51) Int. Cl.
F01D 17/16    (2006.01)
(52) U.S. Cl. ..................................... 415/160
(58) Field of Classification Search ............... 415/150, 415/159–166
See application file for complete search history.

(56) References Cited

U.S. PATENT DOCUMENTS

| | | | | |
|---|---|---|---|---|
| 2,233,983 A * | 3/1941 | Kice, Jr. | ............... | 415/160 |
| 2,805,818 A * | 9/1957 | Ferri | ............... | 415/160 |
| 2,917,275 A * | 12/1959 | Magin | ............... | 415/160 |
| 2,933,234 A * | 4/1960 | Neumann | ............... | 415/149.4 |
| 2,994,509 A * | 8/1961 | Walker | ............... | 415/159 |
| 3,025,036 A * | 3/1962 | Kumm et al. | ............... | 415/160 |
| 3,113,430 A * | 12/1963 | Beale et al. | ............... | 415/163 |
| 3,314,654 A * | 4/1967 | Thenault et al. | ............... | 415/160 |
| 3,352,537 A * | 11/1967 | Petrie | ............... | 415/160 |
| 3,632,224 A * | 1/1972 | Wright et al. | ............... | 415/161 |
| 3,685,920 A * | 8/1972 | Burge | ............... | 415/160 |
| 3,816,021 A * | 6/1974 | Lewis et al. | ............... | 415/147 |
| 3,836,327 A * | 9/1974 | Bartsch | ............... | 8/593 |
| 4,044,815 A | 8/1977 | Smashey et al. | | |
| 4,792,277 A * | 12/1988 | Dittberner et al. | ............... | 415/160 |
| 4,812,106 A * | 3/1989 | Purgavie | ............... | 415/160 |
| 4,834,613 A | 5/1989 | Hansen et al. | | |
| 4,990,056 A * | 2/1991 | McClain et al. | ............... | 415/160 |
| 5,024,580 A | 6/1991 | Olive | | |
| 5,039,277 A | 8/1991 | Naudet | | |
| 5,328,327 A * | 7/1994 | Naudet | ............... | 415/160 |
| 5,380,152 A * | 1/1995 | Sikorski et al. | ............... | 415/160 |
| 5,387,080 A * | 2/1995 | Bouhennicha et al. | ............... | 415/150 |
| 5,601,401 A * | 2/1997 | Matheny et al. | ............... | 415/160 |
| 5,630,701 A * | 5/1997 | Lawer | ............... | 415/160 |
| 6,283,705 B1 | 9/2001 | Rice et al. | | |
| 6,321,449 B2 | 11/2001 | Zhao et al. | | |
| 6,413,043 B1 | 7/2002 | Bouyer | | |
| 6,688,846 B2 * | 2/2004 | Caubet et al. | ............... | 415/160 |

(Continued)

*Primary Examiner*—Christopher Verdier
(74) *Attorney, Agent, or Firm*—Kinney & Lange, P.A.

(57) ABSTRACT

An inner diameter vane shroud accommodates a mechanism for synchronously rotating an away of variable vanes. Particularly, the inner diameter vane shroud has a gear channel that runs circumferentially through the vane shroud. An array of variable vanes is rotatably mounted in the vane shroud at an inner end. The variable vanes comprise vane gears at their inner end, which are rotatable in the gear channel. Disposed between the vane gears of the variable vanes are idler gears. As one of the individual variable vanes is rotated by an actuation source, the other variable vanes of the variable vane away are rotated a like amount by the vane gears and idler gears.

5 Claims, 3 Drawing Sheets

U.S. PATENT DOCUMENTS 6,799,945 B2 * 10/2004 Chatel et al. ................ 415/160
6,843,638 B2    1/2005 Hidalgo et al.
7,104,754 B2 *  9/2006 Willshee et al. ............. 415/159
2003/0113204 A1 * 6/2003 Wolf .......................... 415/165

* cited by examiner

GEAR TRAIN VARIABLE VANE SYNCHRONIZING MECHANISM FOR INNER DIAMETER VANE SHROUD

This invention was made with U.S. Government support under contract number N00019-02-C-3003 awarded by the United States Navy, and the U.S. Government may have certain rights in the invention.

CROSS-REFERENCE TO RELATED APPLICATION(S)

The present application is related to the following copending applications filed on the same day as this application: "RACK AND PINION VARIABLE VANE SYNCHRONIZING MECHANISM FOR INNER DIAMETER VANE SHROUD" by inventors J. Giaimo and J. Tirone III (Ser. No. 11/185,622); "SYNCH RING VARIABLE VANE SYNCHRONIZING MECHANISM FOR INNER DIAMETER VANE SHROUD" by inventors J. Giaimo and J. Tirone III (Ser. No. 11/185,623); "INNER DIAMETER VARIABLE VANE ACTUATION MECHANISM" by inventors J. Giaimo and J. Tirone III (Ser. No. 11/185,995); and "LIGHT-WEIGHT CAST INNER DIAMETER VANE SHROUD FOR VARIABLE STATOR VANES" by inventors J. Giaimo and J. Tirone III (Ser. No. 11/185,995). All of these applications are incorporated herein by this reference.

BACKGROUND OF THE INVENTION

This invention relates generally to gas turbine engines and more particularly to vane shrouds for use in such engines.

Gas turbine engines operate by combusting a fuel source in compressed air to create heated gases with increased pressure and density. The heated gases are ultimately forced through an exhaust nozzle, which is used to step up the velocity of the exiting gases and in-turn produce thrust for driving an aircraft. The heated gases are also used to drive a turbine for rotating a fan to provide air to a compressor section of the gas turbine engine. Additionally, the heated gases are used to drive a turbine for driving rotor blades inside the compressor section, which provides the compressed air used during combustion. The compressor section of a gas turbine engine typically comprises a series of rotor blade and stator vane stages. At each stage, rotating blades push air past the stationary vanes. Each rotor/stator stage increases the pressure and density of the air. Stators serve two purposes: they convert the kinetic energy of the air into pressure, and they redirect the trajectory of the air coming off the rotors for flow into the next compressor stage.

The speed range of an aircraft powered by a gas turbine engine is directly related to the level of air pressure generated in the compressor section. For different aircraft speeds, the velocity of the airflow through the gas turbine engine varies. Thus, the incidence of the air onto rotor blades of subsequent compressor stages differs at different aircraft speeds. One way of achieving more efficient performance of the gas turbine engine over the entire speed range, especially at high speed/high pressure ranges, is to use variable stator vanes which can optimize the incidence of the airflow onto subsequent compressor stage rotors.

Variable stator vanes are typically circumferentially arranged between an outer diameter fan case and an inner diameter vane shroud. Traditionally, mechanisms coordinating the synchronized movement of the variable stator vanes have been located on the outside of the fan case. These systems increase the overall diameter of the compressor section, which is not always desirable or permissible. Also, retrofitting gas turbine engines that use stationary stator vanes for use with variable stator vanes is not always possible. Retrofit variable vane mechanisms positioned on the outside of the fan case interfere with other external components of the gas turbine engine located on the outside of the fan case. Relocating these other external components is often impossible or too costly. Synchronizing mechanisms also add considerable weight to the gas turbine engine. Thus, there is a need for a lightweight variable vane synchronizing mechanism that does not increase the diameter of the compressor section and does not interfere with other external components of the gas turbine engine.

BRIEF SUMMARY OF THE INVENTION

The present invention comprises an inner diameter vane shroud that accommodates a mechanism for synchronously rotating an array of variable vanes. Particularly, the invention comprises an inner diameter vane shroud that has a gear channel that runs circumferential through the vane shroud. An array of variable vanes is rotatably mounted in the vane shroud at an inner end. The variable vanes comprise gears at their inner end, which are rotatable in the gear channel. Disposed between the gears of the variable vanes are idler gears. As one of the individual variable vanes is rotated by an actuation source, the other variable vanes of the variable vane array are rotated a like amount by the gears and idler gears.

DETAILED DESCRIPTION

Figure 1:
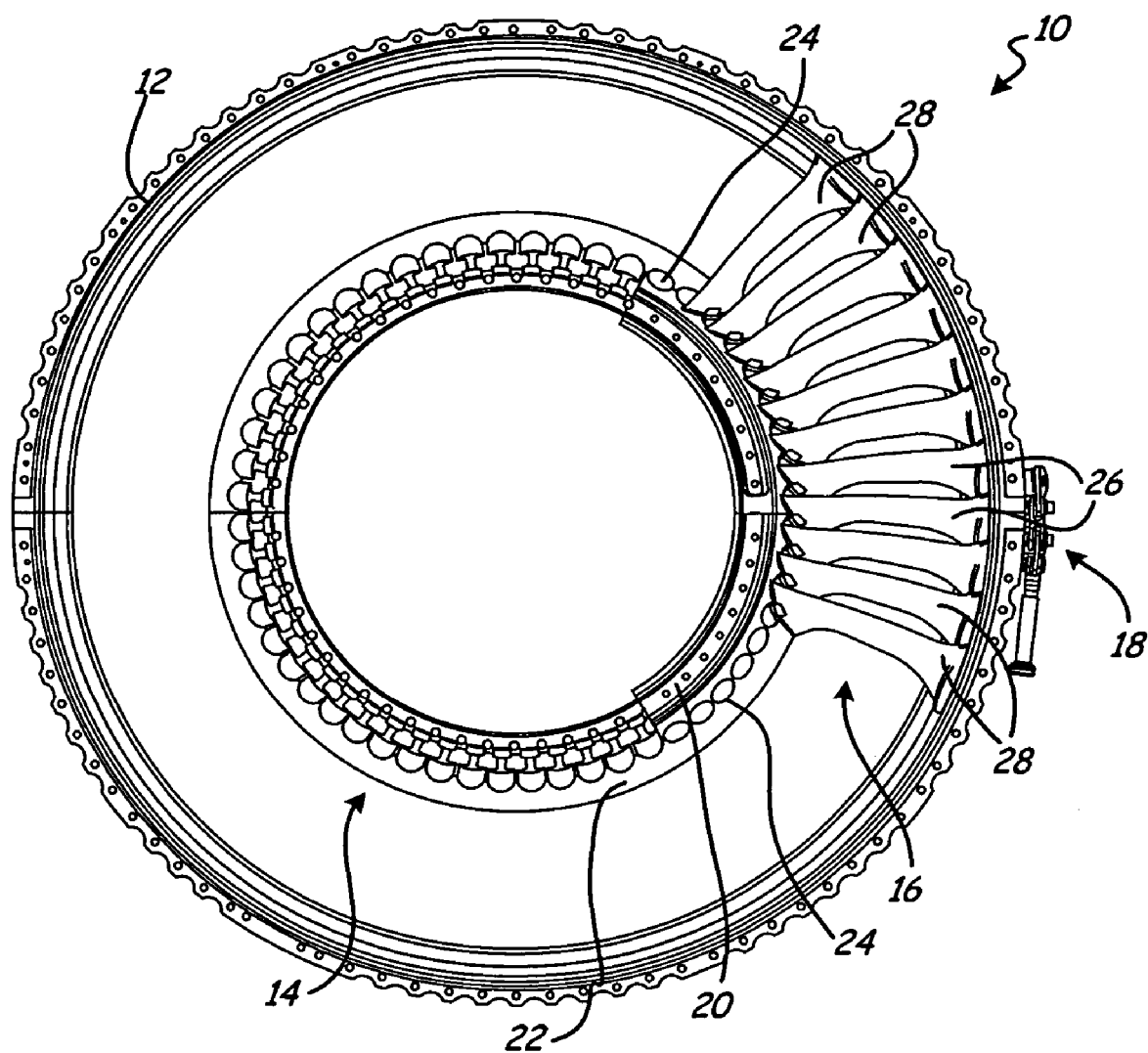
FIG. 1 shows a partially cut away front view of a stator vane section of a gas turbine engine in which the present invention is used.

FIG. 1 shows a partially cut away front view of stator vane section 10 of a gas turbine engine in which the present invention is used. Stator vane section 10 comprises fan case 12, vane shroud 14, variable vane array 16 and actuator 18. Vane shroud 14 is comprised of forward vane shroud component 20 and aft vane shroud component 22, which form inner diameter vane sockets 24. A half-socket, or recess, is located on each of forward vane shroud component 20 and aft vane shroud component 22 to form socket 24. In FIG. 1, only a portion of forward vane shroud component 20 is shown so that the interior of sockets 24 can be seen.

Variable vane array 16 is comprised of drive vanes 26 and a plurality of follower vanes 28. Drive vanes 26 and follower vanes 28 are connected inside inner diameter vane shroud 14 by the gear train variable vane synchronizing mechanism of the present invention. Thus, when actuator 18 rotates drive vanes 26, follower vanes 28 rotate a like amount.

Typically, follower vanes 28 encircle the entirety of vane shroud 14. Only a portion of variable vane array 16 is shown so that sockets 24 can be seen. Drive vanes 26 and follower vanes 28 are rotatably mounted at the outer diameter of stator vane section 10 in fan case 12, and at the inner diameter of stator vane section 10 in vane shroud 14. The number of drive vanes 26 varies in other embodiments and can be as few as one. In one embodiment, variable vane array 16 includes fifty-two follower vanes 28 and two drive vanes 26. Drive vanes 26 are similar in construction to follower vanes 28. In one embodiment, drive vanes 26 are of heavy duty construction to withstand forces applied by actuator 18.

Inner diameter vane shroud 14 can be constructed in component sizes less than the entire circumference of inner diameter vane shroud. In one embodiment, as shown in FIG. 1, forward vane shroud component 20 is made of sections approximately one sixth (i.e. 60°) of the circumference of inner diameter vane shroud 14. In such a case, two sections have nine half-sockets 24 and one section has eight half-sockets 24. Smaller forward vane shroud components 20 assist in positioning forward vane shroud component 20 under the inner diameter ends of drive vanes 26 and follower vanes 28 when they are inserted in sockets 24. In one embodiment for use in split fan case designs, aft shroud component 22 is made of sections approximately one half (i.e. 180°) the circumference of inner diameter vane shroud 14, in which case each section has twenty six half-sockets 24. Additionally, in other embodiments, the gear train variable vane synchronizing mechanism of the present invention can be constructed in smaller segments, such as approximately one half (i.e. 180°) segments, for use in split fan case designs.

Stator vane section 10 is typically located in a compressor section of a gas turbine engine downstream of, or behind, a rotor blade section. Air is forced into stator vane section 10 by a preceding rotor blade section or by a fan. The air that passes through stator vane section 10 typically passes on to an additional rotor blade section. Drive vanes 26 and follower vanes 28 rotate along their respective radial positions in order to control the flow of air through the compressor section of the gas turbine engine. The gear train variable vane synchronizing mechanism of the present invention coordinates their rotation.

Figure 2:
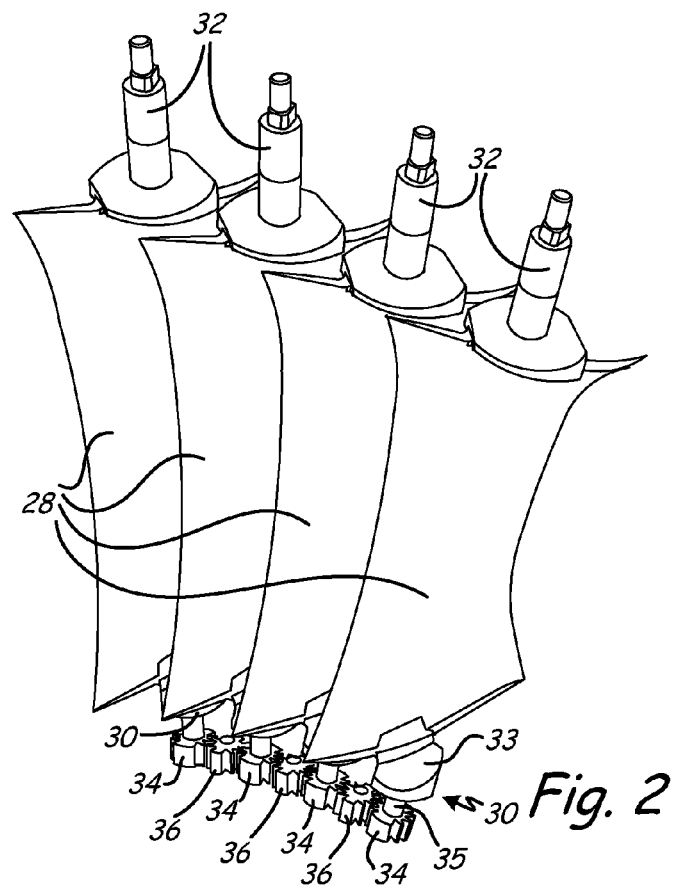
FIG. 2 shows a perspective view of the front of a segment of an array of variable vanes showing the gear train synchronizing mechanism of the present invention.

FIG. 2 shows a perspective view of the front of a segment of variable vane away 16 showing the gear train variable vane synchronizing mechanism of the present invention. Fan case 12, forward vane shroud component 20 and aft vane shroud component 22 are not shown in order to show the interrelation of the gear train synchronizing mechanism. Follower vanes 28 include inner diameter trunnions 30 for rotating in sockets 24 of inner diameter vane shroud 14. Follower vanes 28 include outer diameter trunnions 32 for rotating in bosses of fan case 12 (shown in FIG. 1). Inner diameter trunnions include buttons 33, vane gears 34 and gear posts 35. Typically, at least one outer trunnion 32 is connected to an actuation source outside of fan case 12. Inner trunnions 30 are configured for rotating in sockets 24 of vane shroud 14.

The gear train synchronizing mechanism of the present invention is located on the inside of inner diameter vane shroud 14. The gear train synchronizing mechanism includes vane gears 34 and idler gears 36. The gear train synchronizing mechanism is a simple gear train consisting of alternating driven gears (vane gears 34) and idler gears (idler gears 36). The gear train is aligned in a circular fashion so as to form a closed loop of interconnected gears within vane shroud 14. In other embodiments, the gear train is shaped in arcuate segments, such as approximately half circle (i.e. 180°) segments for use in split fan case designs. Inner trunnions 30 link follower stator vanes 28 with the gear train synchronizing mechanism. Thus, when one of the outer trunnions 32 is rotated by an actuation source, such as the outer trunnions of drive vanes 26, follower vanes 28 rotate in unison by way of the gear train.

Inner trunnions 30 include vane gears 34 at their inner diameter end. Positioned between vane gears 34 are idler gears 36. Vane gears 34 are positioned in an inner gear channel of vane shroud 14 when assembled with forward shroud component 20 and aft shroud component 22. Idler gears 36 are rotatably mounted within the inner gear channel of vane shroud 14. In one embodiment, alternating vane gears 34 and idler gears 36 continue around the entire circumference of vane shroud 14 in conjunction with a full variable vane array 16. In one embodiment, variable vane array 16 includes fifty-four vane gears 34 and fifty-four idler gears 36.

Figure 3:
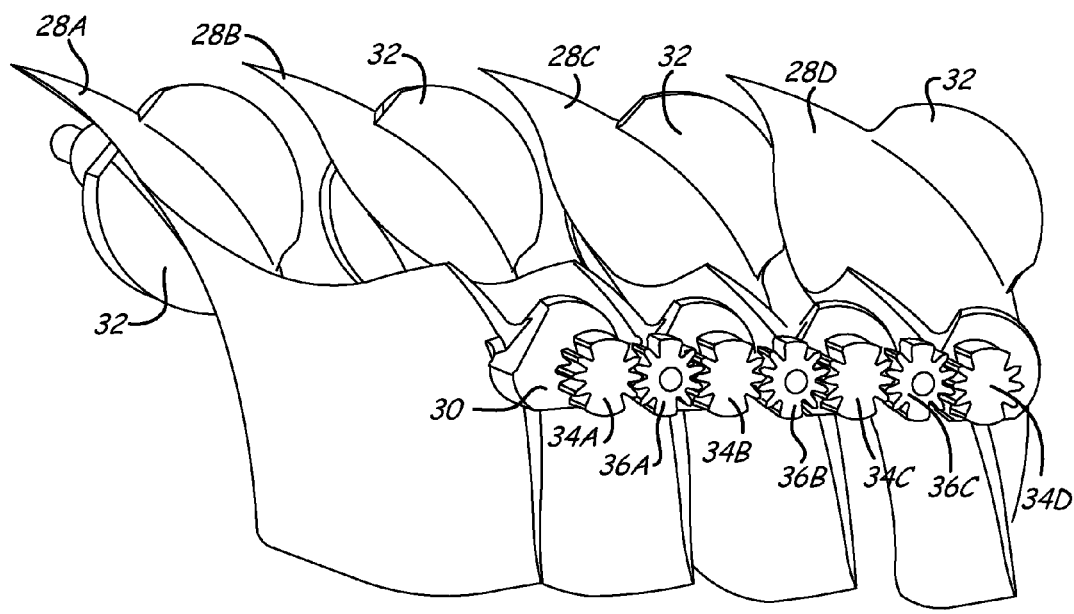
FIG. 3 shows a bottom view of the gear train variable vane synchronizing mechanism of FIG. 2, as seen from the center of the stator vane section looking out.

FIG. 3 shows a bottom view of the gear train variable vane synchronizing mechanism of FIG. 2, as seen from the center of the stator vane section looking out. Vane gears 34A-34D are located at the inner diameter end of follower vanes 28, at the tip of inner trunnions 30. Vane gears 34A-34D are allowed to rotate in the inner gear channel of vane shroud 14. Idler gears 36A-36C are rotatably mounted in the inner gear channel between vane gears 34A-34D.

When one or more of outer trunnions 32 is rotated by an actuation source, the rotation of individual follower vanes 28A-28D is coordinated with the gear train synchronizing mechanism. For example, if stator vane 28A is rotated in a clock-wise direction (as shown in FIG. 3) by actuator 18, idler gear 36A is rotated counter-clock-wise by stator vane 26A. Remaining vane gears 34B-34D and idler gears 36B-36C rotate in a like manner. Vane gear 34B is rotated clock-wise by idler gear 36A. Idler gear 36B is rotated counter-clock-wise by vane gear 34B. Vane gear 34C is rotated clock-wise by idler gear 36B. Idler gear 36C is rotated counter-clock-wise by vane gear 34C. Vane gear 34D is rotated clock-wise by idler gear 36C. This same type of alternating rotation of vane gears and idler gears continues throughout the length of the gear train. Thus, actuation of a single vane rotates the entirety of follower vanes 28 an equal amount.

Figure 4:
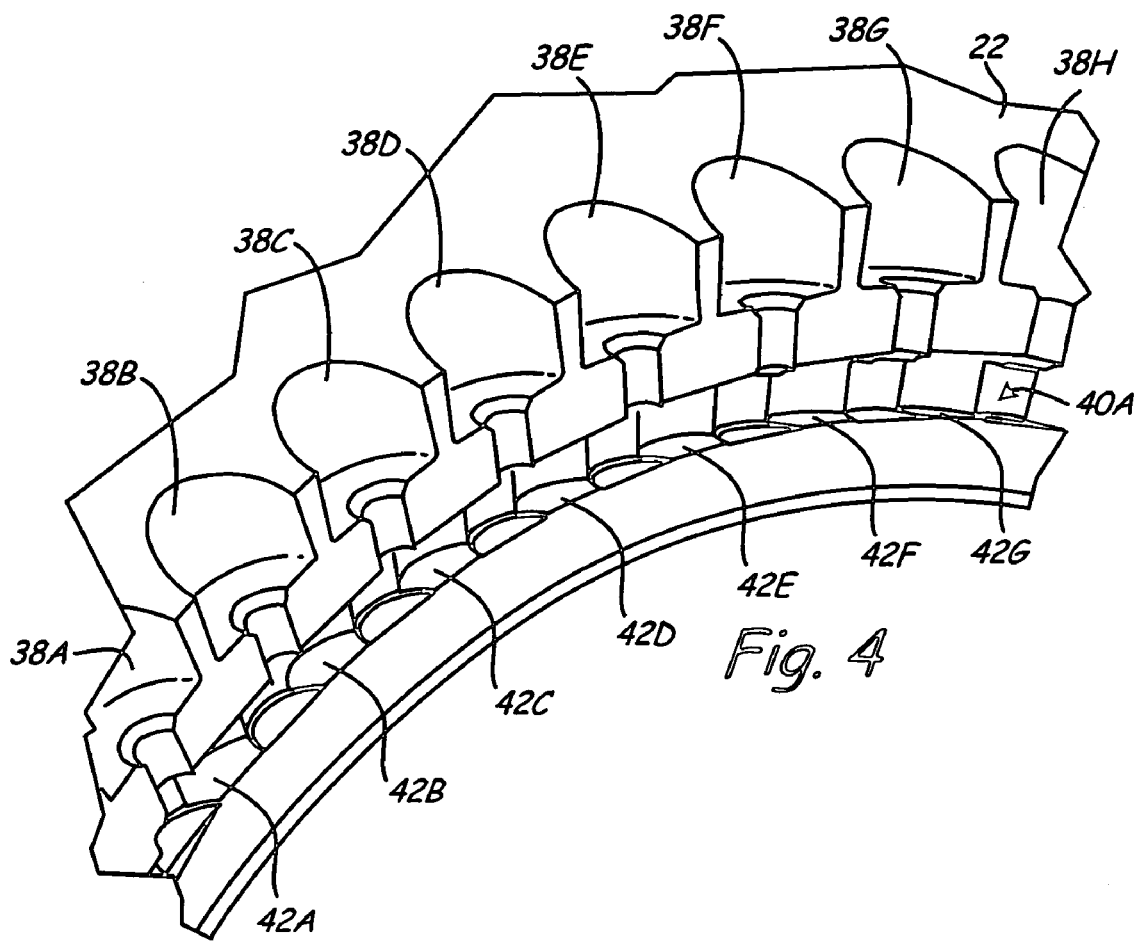
FIG. 4 shows a perspective view of the front of a portion of an aft vane shroud component of an inner diameter vane shroud of the present invention.

FIG. 4 shows a perspective view of the front of a portion of aft vane shroud component 22 of inner diameter vane shroud 14 of the present invention. Aft vane shroud component 22 includes aft recesses 38A-38H for receiving inner trunnions 30 of drive vanes 26 and follower vanes 28. Inner trunnions 30 are inserted into aft recesses 38A-38H such that vane gears 34 are located in aft inner gear channel 40A. Idler gears 36 are rotatably positioned in aft gear channel 40A at intervals between aft recesses 38A-38H at positions 42A-42G.

Figure 5:
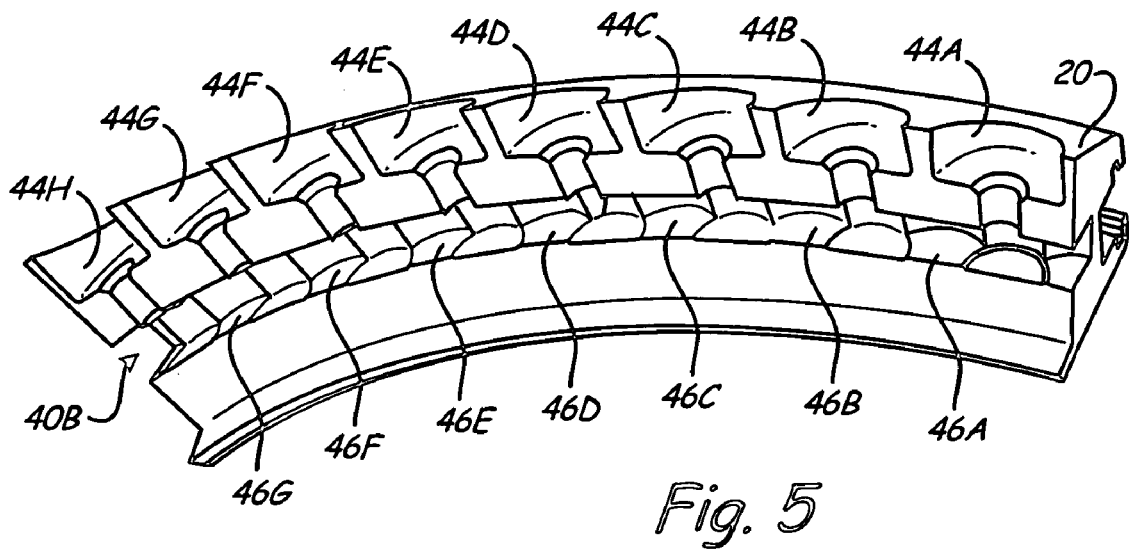
FIG. 5 shows a perspective view of the back of a portion of a forward vane shroud component of an inner diameter vane shroud of the present invention.

FIG. 5 shows a perspective view of the back of a portion of forward vane shroud component 20 of inner diameter vane shroud 14 of the present invention. Forward vane shroud component 20 includes forward recesses 44A-44H for receiving inner trunnions 30 of drive vanes 26 and follower vanes 28. Forward vane shroud component 20 is coupled with aft vane shroud component 22 such that aft recesses 38A-38H and forward recesses 44A-44H match up, respectively. Inner trunnions 30 are positioned inside aft recesses 38A-38H and forward recesses 44A-44H, and vane gears 34 are positioned inside aft gear channel 40A and forward gear channel 40B. Idler gears 36 are positioned at intervals between forward recesses 44A-44H at positions 46A-46G, inside aft gear channel 40A and forward gear channel 40B. Thus, drive vanes 26 and follower vanes 28 are secured with forward shroud component 20 and aft shroud component 22. The gear train comprised of vane gears 34 and idler gears 36 is operably located in aft gear channel 40A and forward gear channel 40B in order to facilitate synchronized rotation of individual stator vanes 26. Thus, the direction of the flow of air exiting stator vane section 10 can be controlled for entry into the next section of the gas turbine engine utilizing the gear train variable vane synchronizing mechanism.

Although the present invention has been described with reference to preferred embodiments, workers skilled in the art will recognize that changes may be made in form and detail without departing from the spirit and scope of the invention.

The invention claimed is:

1. A variable vane assembly having a plurality of rotatable stator vanes radially arranged between an inner diameter vane shroud and an outer diameter fan case such that outer diameter ends of the vanes connect to the fan case and inner diameter ends of the vanes connect to the inner diameter vane shroud, the variable vane assembly characterized by:
   a vane gear carried at an inner end of each rotatable stator vane;
   a plurality of idler gears situated between the vane gears so that the plurality of rotatable stator vanes synchronously rotate; and
   the inner diameter vane shroud comprising a forward vane shroud component and an aft vane shroud component:
      each vane shroud component comprising:
         an arcuate body portion;
         a mating surface comprising:
            partial sockets for receiving inner diameter ends of stator vanes;
            a gear track extending across a width of the mating surface adjacent the partial sockets; and
            a hole connecting each of the partial sockets with the gear track:
         wherein the gear tracks of the forward vane shroud component and the aft vane shroud component mate to form a gear channel disposed therebetween for receiving the vane gears and the plurality of idler gears.

2. A variable vane assembly comprising:
   an annular inner diameter vane shroud comprising:
      a forward vane shroud component;
      an aft vane shroud component;
      an interior gear channel formed of the forward vane shroud component and the aft vane shroud component; and
      sockets formed of the forward vane shroud component and the aft vane shroud component, wherein the gear channel is connected with each of the sockets;
   a plurality of stator vanes extending radially from the inner diameter vane shroud, each vane comprising an inner diameter end positioned in a socket and having a vane gear positioned in the gear channel; and
   a plurality of idler gears located in the gear channel that interface with the vane gears such that when one stator vane is rotated an amount, the plurality of stator vanes are rotated a like amount by the vane gears and idler gears.

3. A stator vane section for use in a gas turbine engine, the stator vane section comprising:
   an annular outer diameter fan case;
   an annular inner diameter vane shroud concentrically disposed within the fan case, the vane shroud comprising:
      a forward vane shroud component;
      an aft vane shroud component;
      a gear channel formed of and concealed between the forward vane shroud component and the aft vane shroud component; and
      sockets formed of the forward vane shroud component and the aft vane shroud component, wherein the gear channel is connected with each of the sockets;
   a drive vane comprising:
      a first inner diameter end rotatably connected to and positioned in a socket of the inner diameter vane shroud;
      a first outer diameter end rotatably connected to the outer diameter fan case;
      a first vane body radially extending between the vane shroud and the fan case; and
      a drive gear for rotating in the gear channel;
   an actuator connected to the outer diameter end of the drive vane and for rotating the outer diameter end of the drive vane within the outer diameter fan case;
   a plurality of follower vanes each comprising:
      a second inner diameter end rotatably connected to and positioned in a socket of the inner diameter vane shroud;
      a second outer diameter end rotatably connected to the outer diameter fan case;
      a second vane body radially extending between the vane shroud and the fan case; and
      a follower gear located at the gear channel of the inner diameter end; and
   a plurality of idler gears rotatably positioned along the gear channel to interface with the drive gear and follower gears such that when the drive vane is rotated an amount by the actuator, the follower vanes are rotated a like amount by the follower gears and the plurality of idler gears.

4. A variable vane for use in a gas turbine engine having an outer diameter fan case and an inner diameter vane shroud, the variable vane comprising:
   a blade portion;
   an outer diameter end having a cylindrical, radially extending outer diameter trunnion for rotating in the fan case;
   an inner diameter end having a radially extending inner diameter trunnion for rotating in the inner diameter vane shroud, the inner diameter trunnion comprising:
      a button configured for rotating in a vane socket of the inner diameter vane shroud;
      a gear positioned at a tip of the inner diameter end; and
      a gear post extending from the button and connected to the gear.

5. The variable vane of claim 4 wherein the outer diameter trunnion is configured for connection to an actuator.

* * * * *

UNITED STATES PATENT AND TRADEMARK OFFICE
CERTIFICATE OF CORRECTION

| | | |
|---|---|---|
| PATENT NO. | : 7,628,579 B2 | Page 1 of 1 |
| APPLICATION NO. | : 11/185624 | |
| DATED | : December 8, 2009 | |
| INVENTOR(S) | : John A. Giaimo et al. | |

It is certified that error appears in the above-identified patent and that said Letters Patent is hereby corrected as shown below:

On the Title Pg, Item (57)

In the Abstract, Line 2, delete "away", insert --array--

In the Abstract, Line 10, delete "away", insert --array--

In the Abstract, Line 44, delete "away", insert --array--

Signed and Sealed this

First Day of June, 2010

David J. Kappos
*Director of the United States Patent and Trademark Office*